(12) United States Patent
Liu et al.

(10) Patent No.: US 10,554,379 B2
(45) Date of Patent: Feb. 4, 2020

(54) METHOD FOR OBTAINING PHASE DETECTION SIGNAL IN CLOCK RECOVERY CIRCUIT AND PHASE DETECTOR

(71) Applicant: Huawei Technologies Co., Ltd., Shenzhen, Guangdong (CN)

(72) Inventors: Ling Liu, Wuhan (CN); Wentong Wan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/283,619

(22) Filed: Feb. 22, 2019

(65) Prior Publication Data

US 2019/0190692 A1     Jun. 20, 2019

Related U.S. Application Data

(63) Continuation of application No. PCT/CN2016/096387, filed on Aug. 23, 2016.

(51) Int. Cl.
*H04B 10/69*     (2013.01)
*H04L 7/00*     (2006.01)
(Continued)

(52) U.S. Cl.
CPC ......... *H04L 7/0079* (2013.01); *H04B 10/616* (2013.01); *H04B 10/69* (2013.01); *H04L 7/033* (2013.01); *H04L 7/042* (2013.01)

(58) Field of Classification Search
CPC ... H04B 10/69; H04L 2027/0067; H04L 7/10; H04L 7/033; H04L 7/042
(Continued)

(56) References Cited

U.S. PATENT DOCUMENTS 5,552,942 A * 9/1996 Ziperovich ...... G11B 20/10009
                                                    360/51
5,596,582 A * 1/1997 Sato .................... H04L 27/2657
                                                    370/203

(Continued)

FOREIGN PATENT DOCUMENTS

CN          1309483 A      8/2001
CN          1471232 A      1/2004
(Continued)

*Primary Examiner* — Emmanuel Bayard
(74) *Attorney, Agent, or Firm* — Kilpatrick Townsend & Stockton LLP

(57) ABSTRACT

Embodiments of this application provide a method for obtaining a phase detection signal in a clock recovery circuit and a phase detector, configured to obtain a correct phase detection signal. A phase detector obtains sampling sequences sent by an analog to digital converter ADC, where the sampling sequences are obtained by the ADC by sampling, an electrical signal received by the ADC, and the electrical signal carries a pre-configured training sequence; the phase detector calculates a correlation between the sampling sequences and a comparison sequence, to determine a first location and a second location, where the first location and the second location are locations of a starting point of the training sequence in the sampling sequences; and the phase detector obtains a phase detection signal based on a difference parameter of the first location and the second location.

13 Claims, 2 Drawing Sheets

(51) Int. Cl.
*H04B 10/61* (2013.01)
*H04L 7/04* (2006.01)
*H04L 7/033* (2006.01)

(58) Field of Classification Search
USPC ................ 375/294, 316, 327, 340, 354, 375
See application file for complete search history.

(56) References Cited

U.S. PATENT DOCUMENTS

| | | | |
|---|---|---|---|
| 5,973,643 A * | 10/1999 | Hawkes | G01S 1/045 |
| | | | 342/457 |
| 6,542,039 B1 * | 4/2003 | Ogura | G11B 20/10009 |
| | | | 331/1 A |
| 6,704,374 B1 | 3/2004 | Belotserkovsky et al. | |
| 7,646,559 B1 * | 1/2010 | Cheung | G11B 5/59633 |
| | | | 360/51 |
| 8,098,783 B2 | 1/2012 | Panikkar et al. | |
| 8,548,072 B1 | 10/2013 | Eliaz | |
| 9,305,581 B2 * | 4/2016 | Annampedu | G11B 5/59627 |
| 2005/0163262 A1 | 7/2005 | Gupta | |
| 2007/0092044 A1 | 4/2007 | Wang et al. | |
| 2007/0253475 A1 | 11/2007 | Palmer | |
| 2009/0245448 A1 | 10/2009 | Ran et al. | |
| 2012/0147493 A1 * | 6/2012 | Grundvig | G11B 5/012 |
| | | | 360/51 |
| 2012/0269304 A1 | 10/2012 | Ciacci et al. | |
| 2012/0308227 A1 | 12/2012 | Komaki et al. | |
| 2014/0003476 A1 | 1/2014 | Xu et al. | |
| 2014/0211896 A1 | 7/2014 | Chang et al. | |
| 2016/0134449 A1 | 5/2016 | Liu et al. | |
| 2017/0019148 A1 * | 1/2017 | Williams | H04B 17/354 |

FOREIGN PATENT DOCUMENTS

| | | |
|---|---|---|
| CN | 1564505 A | 1/2005 |
| CN | 101032139 A | 9/2007 |
| CN | 101789253 A | 7/2010 |
| CN | 101820340 A | 9/2010 |
| CN | 102752097 A | 10/2012 |
| CN | 102938695 A | 2/2013 |
| CN | 103516640 A | 1/2014 |
| CN | 103547344 A | 1/2014 |

* cited by examiner

METHOD FOR OBTAINING PHASE DETECTION SIGNAL IN CLOCK RECOVERY CIRCUIT AND PHASE DETECTOR

CROSS-REFERENCE TO RELATED APPLICATIONS

This application is a continuation of International Application No. PCT/CN2016/096387, filed on Aug. 23, 2016, the disclosure of which is hereby incorporated by reference in its entirety.

TECHNICAL FIELD

Embodiments of this application relates to the communications field, and in particular, to a method for obtaining a phase detection signal in a clock recovery circuit and a phase detector.

BACKGROUND

In a coherent light communication system, after completing optical-to-electrical conversion, a receiver needs to convert an analog electrical signal into a digital signal by using an analog to digital converter (ADC) for subsequent digital-domain algorithm processing. A clock recovery circuit is a critical module ensuring that a rate at which the ADC converts the analog signal into the digital signal is corresponding to a rate at which a transmitter sends a signal. In the clock recovery circuit, a phase detector determines a deviation of a current sampling rate from a target sampling rate, and a feedback control circuit adjusts an actual sampling rate of the ADC, to achieve an objective that the receiver is synchronous with the transmitter.

In the prior art, in the clock recovery circuit, the phase detector performs, based on a waveform, calculation on a signal received by a receiving end, to obtain a phase detection signal. The phase detection signal may be fed back, after digital filtering, to a voltage-controlled oscillator device that simulates a peripheral circuit, so that the voltage-controlled oscillator device adjusts the actual sampling rate of the ADC of the receiver. Alternatively, the phase detection signal may be fed back to a numerically controlled oscillator, so that the numerically controlled oscillator completes numeral interpolation on sampling sequences of the ADC of the receiver.

However, in coherent light communication, a waveform of a signal is affected by factors such as random polarization rotation, a polarization-dependent loss, polarization mode dispersion, chromatic dispersion, a channel bandwidth impairment, and a frequency offset between transmit and receive lasers in an optical fiber. Consequently, an error of the phase detection signal obtained by a conventional phase detector through calculation based on the waveform is relatively large.

SUMMARY

Embodiments of this application provide a method for obtaining a phase detection signal in a clock recovery circuit and a phase detector, configured to obtain a correct phase detection signal.

According to a first aspect, an embodiment of this application provides a method for obtaining a phase detection signal in a clock recovery circuit, including: receiving, by an ADC, an electrical signal carrying a pre-configured training sequence and obtaining sampling sequences by sampling the electrical signal based on an actual sampling rate, and then, sending, by the ADC, the sampling sequences to a phase detector; calculating, by the phase detector, a correlation between the sampling sequences and a comparison sequence that is generated by the phase detector based on the training sequence and a target sampling rate of the ADC, to determine a first location and a second location of a starting point of the training sequence in the sampling sequences, where there is a difference of $M_1$ training sequence periods (where $M_1$ is a positive integer) between the first location and the second location in the sampling sequences; and obtaining, by the phase detector, a phase detection signal based on a difference parameter of the first location and the second location.

In this embodiment of this application, the phase detector obtains a comparison sequence period $N_P$ through calculation based on $N_P = N*K$, obtains a length of a first sequence that is $L_P$ in the comparison sequence through calculation based on $L_P = L + L*(K-1)$, obtains, based on $Y=(N-L)*K$, a quantity of numerals Y added after the first sequence in the comparison sequence. The comparison sequence includes the first sequence and the added numerals, and the first sequence is a sequence generated by performing numeral interpolation on data of the training sequence based on the target sampling rate.

N is a training sequence period, K is a multiple of the target sampling rate relative to a sending rate of a transmitter, and L is a length of the training sequence.

In the technical solution provided in this embodiment of this application, the phase detector no longer calculates the phase detection signal based on a waveform, but determines the phase detection signal by positioning the locations of the starting point of the known training sequence. Therefore, impact caused by various system impairments on a calculation process is avoided, and a correct phase detection signal is obtained.

Optionally, when the phase detector determines a location of the training sequence in the sampling sequences, the following solution may be used: The phase detector calculates a correlation between the comparison sequence and the sampling sequence based on a first formula, to determine the first location of the starting point of the training sequence; and the phase detector calculates a correlation between the comparison sequence and the sampling sequence based on a second formula, to determine the second location of the starting point of the training sequence.

In the technical solution provided in this embodiment of this application, the phase detector calculates and positions the locations of the starting point of the known training sequence based on specific formulas, so that computation is conveniently performed.

Based on the foregoing solution, optionally, the first formula is:

$$C_{n_0}[i] = \sum_{k_2=0}^{k_2=m-1} \sum_{k_1=0}^{k_1=N_p-1} r[n_0 + k_2 * N_p + k_1] P^* [\mathrm{mod}(k_1 + i - 1, N_p) + 1];$$

the second formula is:

$$C_{n_1}[i] = \sum_{k_2=0}^{k_2=m-1} \sum_{k_1=0}^{k_1=N_p-1} r[n_1 + k_2 * N_p + k_1] P^* [\mathrm{mod}(k_1 + i - 1, N_p) + 1];$$

the first location is:

a data sequence number corresponding to i in $\max(C_{n_0}[i]$, i=1, 2, ..., $N_p)$; and the second location is:

a data sequence number corresponding to i in $\max(C_{n_1}[i]$, i=1, 2, ..., $N_p)$, where r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of $K_1 N_{p_s}$ is performed on $n_0$ (where $K_1$ is a positive integer), and m is a quantity of preselected comparison sequence periods.

Optionally, the first formula is:

$$C_{n_0}[i]=\Sigma_{k_2=0}^{k_2=m-1}|\Sigma_{k_1=0}^{k_1=N_p-1}r[n_0+k_2*N_p+k_1]P^*[\mod(k_1+i-1,N_p)+1]|;$$

the second formula is:

$$C_{n_1}[i]=\Sigma_{k_2=0}^{k_2=m-1}|\Sigma_{k_1=0}^{k_1=N_p-1}r[n_1+k_2*N_p+k_1]P^*[\mod(k_1+i-1,N_p)+1]|;$$

the first location is:

a data sequence number corresponding to i in $\max(C_{n_0}[i]$, i=1, 2, . . . , $N_p$); and the second location is:

a data sequence number corresponding to i in $\max(C_{n_1}[i]$, i=1, 2, . . . , $N_p$), where r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of $K_1 N_{p_s}$ is performed on $n_0$ (where $K_1$ is a positive integer), and m is a quantity of preselected comparison sequence periods.

In actual application, m in the formula may be any positive integer, and an interval between $n_1$ and $n_0$ may also be any positive integer. Specific data is not limited herein.

In this embodiment of this application, the phase detector may resist different impairments by using different formulas, and this helps flexibly deal with various different cases in the clock recovery circuit; a deviation estimation range of the clock recovery circuit may be effectively controlled based on a selection of the interval between $n_1$ and $n_0$, and this helps improve correctness of the phase detection signal.

Optionally, after the phase detector obtains the phase detection signal, the phase detector may further perform the following step: sending, by the phase detector, the phase detection signal to the ADC, so that the ADC feeds back the phase detection signal to a voltage-controlled oscillator, and the voltage-controlled oscillator adjusts the actual sampling rate based on the phase detection signal.

In actual application, the phase detector may further directly feed back the phase detection signal to a numerically controlled oscillator, so that the numerically controlled oscillator directly performs numeral interpolation on the sampling sequences. A specific method for adjusting the clock recovery circuit is not limited herein.

Optionally, for a specific method for obtaining, by the phase detector, the phase detection signal based on the difference parameter of the first location and the second location is as follows:

The phase detector compares the first location with the second location to obtain the difference parameter. If the difference parameter indicates that the first location is greater than the second location, the phase detector determines that the phase detection signal indicates that the actual sampling rate is less than the target sampling rate; if the difference parameter indicates that the first location is less than the second location, the phase detector determines that the phase detection signal indicates that the actual sampling rate is greater than the target sampling rate; or if the difference parameter indicates that the first location is equal to the second location, the phase detector determines that the phase detection signal indicates that the actual sampling rate is equal to the target sampling rate.

According to a second aspect, an embodiment of this application provides a phase detector, and the phase detector has a function for implementing the phase detector in the foregoing method. The function may be implemented by using hardware, or may be implemented by hardware executing corresponding software. The hardware or software includes one or more modules corresponding to the foregoing function.

In a possible implementation, the phase detector includes:

a receiving module, configured to receive sampling sequences sent by an analog to digital converter ADC, where the sampling sequences are obtained by the ADC by sampling, based on an actual sampling rate, an electrical signal received by the ADC, and the electrical signal carries a pre-configured training sequence; and a processing module, configured to: calculate a correlation between the sampling sequences and a comparison sequence, to determine a first location and a second location, where the first location and the second location are locations of a starting point of the training sequence in the sampling sequences, there is a difference of $M_1$ training sequence periods (where $M_1$ is a positive integer) between the first location and the second location in the sampling sequences, and the comparison sequence is generated by the phase detector based on the training sequence and a target sampling rate of the ADC; and obtain a phase detection signal based on a difference parameter of the first location and the second location.

In another possible implementation, the phase detector includes:

a transceiver, a processor, and a bus, where the transceiver is connected to the processor by using the bus;

the transceiver performs the following step:

receiving sampling sequences sent by an analog to digital converter ADC, where the sampling sequences are obtained by the ADC by sampling, based on an actual sampling rate, an electrical signal received by the ADC, and the electrical signal carries a pre-configured training sequence; and the processor performs the following steps:

calculating a correlation between the sampling sequences and a comparison sequence, to determine a first location and a second location, where the first location and the second location are locations of a starting point of the training sequence in the sampling sequences, there is a difference of $M_1$ training sequence periods (where $M_1$ is a positive integer) between the first location and the second location in the sampling sequences, and the comparison sequence is generated by the phase detector based on the training sequence and a target sampling rate of the ADC; and obtaining a phase detection signal based on a difference parameter of the first location and the second location.

According to a third aspect, a computer storage medium is provided, the computer storage medium stores program code, and the program code is used to execute the method in the foregoing first aspect.

In the technical solutions provided in the embodiments of this application, a phase detector receives sampling sequences obtained by an ADC by sampling an electrical signal based on an actual sampling rate, and calculates a correlation between the sampling sequences and a comparison sequence that is generated by the phase detector based on a training sequence and a target sampling rate of the ADC, to obtain a first location and a second location of a starting point of the training sequence in the sampling sequences in different periods. The phase detector uses a difference parameter of the first location and the second location as a phase detection signal. The phase detector no longer calculates the phase detection signal based on a waveform, but determines the phase detection signal by positioning the locations of the starting point of the known training sequence. Therefore, impact caused by various system impairments on a calculation process is avoided, and a correct phase detection signal is obtained.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by a person skilled in the art based on the embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those units, but may include other units not expressly listed or inherent to such a process, method, product, or device.

Embodiments of this application provide a method for obtaining a phase detection signal in a clock recovery circuit and a phase detector, configured to obtain a correct phase detection signal.

Figure 1:
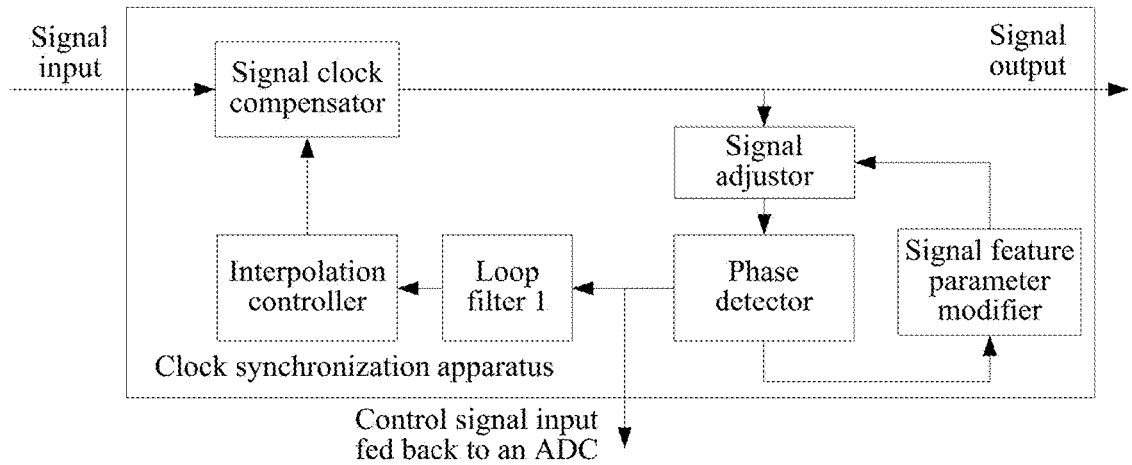
FIG. 1 is a schematic diagram of a clock synchronization apparatus according to an embodiment of this application.

Referring to a clock synchronization apparatus shown in FIG. 1, the clock synchronization apparatus includes a signal clock compensator, an interpolation controller, a loop filter, a phase detector, a signal adjuster, and a signal feature parameter modifier. In an application process, there may be a plurality of loop filters. This is not limited herein. In the clock synchronization apparatus, the signal clock compensator, the signal adjuster, the loop filter, the interpolation controller, and the signal feature parameter modifier are configured to adjust a signal, so that the signal meets an input requirement of the clock synchronization apparatus. After the signal meets the input requirement of the clock synchronization apparatus, the phase detector calculates a phase detection signal of the signal, feeds back the phase detection signal to an ADC, and then adjusts a sampling clock used by the ADC for a data sequence.

The current phase detector usually calculates a phase detection signal of a signal based on a signal waveform. However, in coherent light communication, the signal waveform is affected by factors such as random polarization rotation, a polarization-dependent loss, polarization mode dispersion, chromatic dispersion, a channel bandwidth impairment, and a frequency offset between transmit and receive lasers in an optical fiber. Consequently, an error of the phase detection signal obtained by the phase detector through calculation based on the waveform is relatively large.

To resolve this problem, the embodiments of this application provide the following technical solution: A phase detector receives sampling sequences obtained by an ADC by sampling an electrical signal based on an actual sampling rate, and calculates a correlation between the sampling sequences and a comparison sequence that is generated by the phase detector based on a training sequence and a target sampling rate of the ADC, to obtain a first location and a second location of the starting point of the training sequence in the sampling sequences in different periods. The phase detector uses a difference parameter of the first location and the second location as a phase detection signal.

Figure 2:
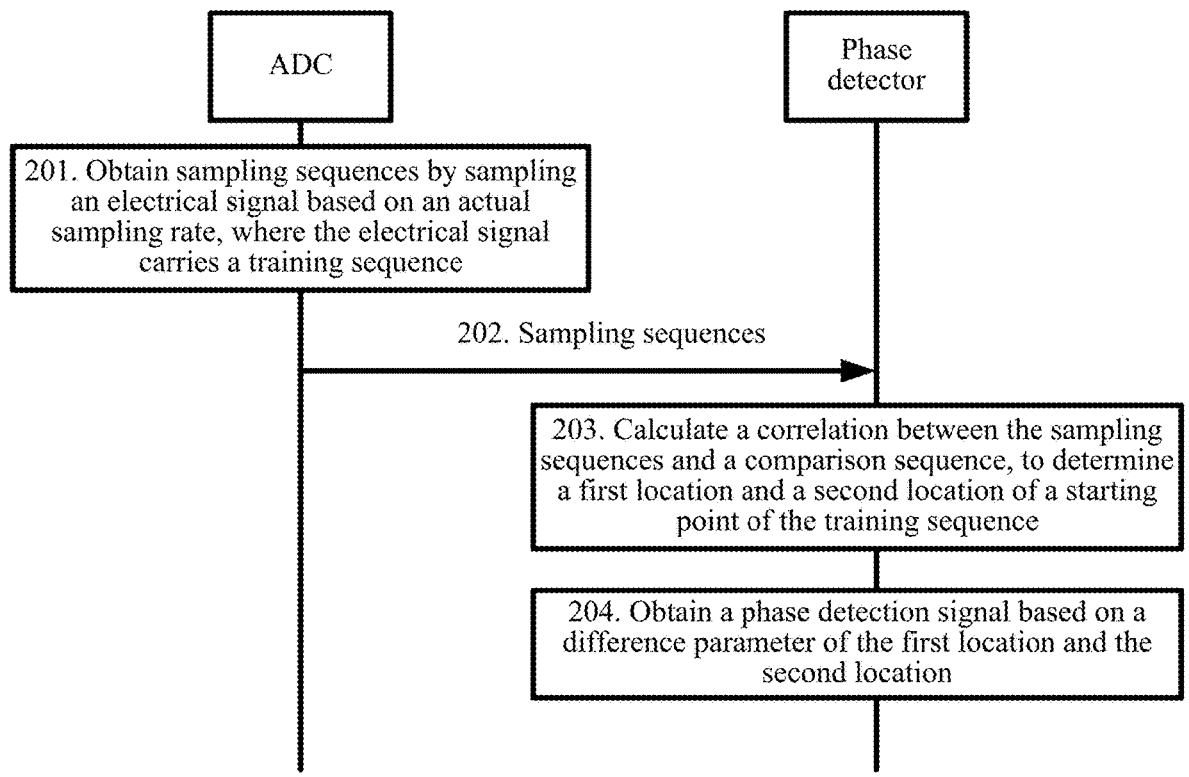
FIG. 2 is a schematic diagram of an embodiment of a method for obtaining a phase detection signal according to an embodiment of this application.

Specifically, referring to FIG. 2, an embodiment of this application provides an embodiment of a method for obtaining a phase detection signal. Specifics are as follows:

201. An ADC obtains sampling sequences by sampling an electrical signal based on an actual sampling rate, where the electrical signal carries a training sequence.

On a transmitter end, a digital signal carrying the training sequence is usually converted into an electrical signal, and the electrical signal is sent to a receiver end. On the receiver end, the ADC samples the received electrical signal based on the actual sampling rate of the ADC and converts the electrical signal into the digital signal. In other words, the sampling sequences are generated.

In actual application, a specific value, a period, and a length of the training sequence may be agreed upon in a protocol by the transmitter end and the receiver end. In addition, the target sampling rate of the ADC is configured in advance. Generally, the target sampling rate is a positive integer multiple or a fraction multiple of a Baud rate at which the transmitter end sends a symbol. A fraction in the fraction multiple is greater than 1. For example, a rule of sending data by the transmitter end may be sending four pieces of training sequence data in every 256 pieces of data. To be specific, the length of the training sequence is 4 and the period is 256. If the target sampling rate of the ADC is one multiple of the Baud rate at which the transmitter end sends a symbol, and if the Baud rate at which the transmitter end sends a symbol is 1 Gbaud/s, the target sampling rate of the ADC of the receiver is 1 Gsample/s.

202. The ADC sends the sampling sequences to a phase detector.

The ADC sends the sampling sequences obtained through sampling to the phase detector.

203. The phase detector calculates a correlation between the sampling sequences and a comparison sequence, to determine a first location and a second location of a starting point of the training sequence.

Figure 3:
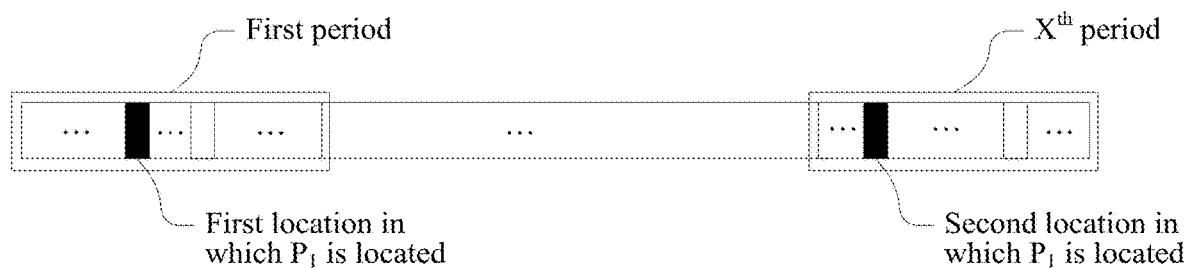
FIG. 3 is a schematic diagram of a relationship between a first location and a second location of a training sequence according to an embodiment of this application.

The phase detector may learn the target sampling rate of the ADC and the training sequence in advance, and then the phase detector generates the comparison sequence based on the training sequence and the target sampling rate and stores the comparison sequence. After the phase detector receives the sampling sequences, the phase detector calculates a correlation between the sampling sequences and the comparison sequence, to determine a first location and a second location of a starting point of the training sequence in the sampling sequences. The first location and the second location herein are located in different periods, and the relationship between the first location and the second location is shown in FIG. 3. The first location is a data sequence number of $P_1$ of the training sequence in a first period, and the second location is a data sequence number of $P_1$ of the training sequence in an $X^{th}$ period. In addition, in actual application, the first period may include a plurality of training sequence periods, and a quantity of training sequence periods included in the $X^{th}$ period is the same as a quantity of training sequence periods included in the first period. However, a period interval between the first period and the $X^{th}$ period is not limited, and a specific value is not limited herein. For example, each training sequence period has 256 pieces of data. In other words, there are 256 data sequence numbers in each training sequence period. The first period includes ten training sequence periods. In other words, the first period includes 2560 pieces of data, and there are 2560 data sequence numbers. Similarly, the $X^{th}$ period also includes ten training sequence periods. In other words, the $X^{th}$ period includes 2560 pieces of data, and there are 2560 data sequence numbers. In addition, the phase detector may obtain the first location and the second location of the starting point of the training sequence in the sampling sequences by using the following method: The phase detector calculates a correlation between the comparison sequence and the sampling sequence based on a first formula, to determine the first location of the starting point of the training sequence; and the phase detector calculates a correlation between the comparison sequence and the sampling sequence based on a second formula, to determine the second location of the starting point of the training sequence.

The first formula is:

$$C_{n_0}[i]=\Sigma_{k_2=0}^{k_2=m-1}\Sigma_{k_1=0}^{k_1=N_p-1}r[n_0+k_2*N_p+k_1]P*[\mod(k_1+i-1,N_p)+1];$$

the second formula is:

$$C_{n_1}[i]=\Sigma_{k_2=0}^{k_2=m-1}\Sigma_{k_1=0}^{k_1=N_p-1}r[n_1+k_2*N_p+k_1]P*[\mod(k_1+i-1,N_p)+1];$$

the first location is:

a data sequence number corresponding to i in $\max(C_{n_0}[i]$, i=1, 2, . . . , $N_p$); and the second location is:

a data sequence number corresponding to i in $\max(C_{n_1}[i]$, i=1, 2, . . . , $N_p$), where r is the sampling sequence, P is the comparison sequence, $n_0$ is the starting point of the sampling sequence,  is a comparison sequence period, i is a data sequence number of the sampling sequence, $n_1$ is the starting point of the sampling sequence after a delay of $K_1 N_{p_s}$ is performed on $n_0$ (where $K_1$ is a positive integer), and m is a quantity of preselected comparison sequence periods. In this embodiment, a value of m may be 10. There may be a difference of two training sequence periods between the first period in which the first location is located and the $X^{th}$ period in which the second location is located. The first location of $P_1$ obtained by the phase detector by using the first formula may be a $34^{th}$ location in the first period, and the second location of $P_1$ obtained by the phase detector by using the second formula may be a $35^{th}$ location in the $X^{th}$ period.

In actual application, to specially reduce impact caused by some impairments, the phase detector may correspondingly change the first formula and the second formula. For example, to reduce impact caused by a frequency offset, the phase detector may change the first formula and the second formula to the following formulas: The first formula is:

$$C_{n_0}[i]=\Sigma_{k_2=0}^{k_2=m-1}|\Sigma_{k_1=0}^{k_1=N_p-1}r[n_0+k_2*N_p+k_1]P*[\mod(k_1+i-1,N_p)+1]|;$$

the second formula is:

$$C_{n_1}[i]=\Sigma_{k_2=0}^{k_2=m-1}|\Sigma_{k_1=0}^{k_1=N_p-1}r[n_1+k_2*N_p+k_1]P*[\mod(k_1+i-1,N_p)+1]|;$$

the first location is:

$\max(C_{n_0}[i]$, i=1, 2, . . . , $N_p$) a data sequence number corresponding to i in $\max(C_{n_0}[i]$, i=1, 2, . . . , $N_p$); and the second location is:

a data sequence number corresponding to i in $\max(C_{n_1}[i]$, i=1, 2, . . . , $N_p$), where r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of $K_1 N_{p_s}$ is performed on $n_0$ (where $K_1$ is a positive integer), and m is a quantity of preselected comparison sequence periods.

A formula used by the phase detector to calculate a correlation between the comparison sequence and the sampling sequences is not limited herein.

In the foregoing embodiment, the phase detector may generate the comparison sequence based on the target sampling rate of the ADC and the training sequence by using the following solution: Assuming that a length L of the training sequence is 4, a period N is 256, and the target sampling rate of the ADC is one multiple of the Baud rate at which the transmitter end sends a symbol, the comparison sequence generated by the phase detector is $\{P_1, P_2, P_3, P_4, 0, 0, \ldots, 0\}$.

$\{P_1, P_2, P_3, P_4\}$ is four pieces of training sequence data, and 252 zeros are added after $\{P_1, P_2, P_3, P_4\}$, so that the period of the comparison sequence is the same as that of the sampling sequences.

If the target sampling rate of the ADC is a positive integer multiple of the Baud rate at which the transmitter end sends a symbol, for example, K multiples, L*(K−1) zeros are interpolated in the training sequence used for synchronization. If K=2, that is, the target sampling rate of the ADC is two multiples of the Baud rate at which the transmitter end sends a symbol, the comparison sequence is $\{0,P_1,0,P_2,0,P_3,0,P_4,0,0, \ldots ,0\}$. $\{0,P_1,0,P_2,0,P_3,0,P_4\}$ is training sequence data in the comparison sequence, and there is a total of (N−L)*K zeros behind $\{0,P_1,0,P_2,0,P_3,0,P_4\}$, namely, (256−4)*2 zeros.

If the target sampling rate of the ADC is a fraction multiple of the Baud rate at which the transmitter end sends a symbol, for example, a K1/K2 multiple, upsampling with zero interpolation may be first performed based on a K1 multiple, and then downsampling is performed based on a K2 multiple, to obtain the comparison sequence for a required sampling rate, or a corresponding comparison sequence is obtained in any proper resampling manner.

204. The phase detector obtains a phase detection signal based on a difference parameter of the first location and the second location.

The phase detector compares the first location with the second location to obtain the difference parameter. If the difference parameter indicates that the first location is greater than the second location, the phase detection signal indicates that the actual sampling rate is less than the target sampling rate; if the difference parameter indicates that the first location is less than the second location, the phase detection signal indicates that the actual sampling rate is greater than the target sampling rate; or if the difference parameter indicates that the first location is equal to the second location, the phase detection signal indicates that the actual sampling rate is equal to the target sampling rate, and it indicates that the actual sampling rate of the ADC is a correct value. For example, in this embodiment, if the first location is 34, and the second location is 35, the difference parameter indicates that the first location is less than the second location by 1. In other words, it indicates that the actual sampling rate of the ADC is greater than the target sampling rate of the ADC.

In actual application, after obtaining the phase detection signal, the phase detector feeds back the phase detection signal to a clock recovery circuit, so that the actual sampling rate of the ADC is adjusted in the clock recovery circuit, and the actual sampling rate of the ADC may be equal to the target sampling rate of the ADC. In addition, the actual sampling rate of the ADC may be adjusted in the clock recovery circuit in the following manners.

A first possible implementation is: The phase detector sends the phase detection signal to the ADC, and then the ADC sends the phase detection signal to a voltage-controlled oscillator to adjust the actual sampling rate of the ADC.

Another possible implementation is: The phase detector feeds back the phase detection signal to a numerically controlled oscillator, so that the numerically controlled oscillator performs numeral interpolation on the sampling sequences of the ADC. A specific manner is not limited herein provided that the sampling rate of data can be adjusted.

In actual application, after the actual sampling rate of the ADC is adjusted based on the phase detection signal in the clock recovery circuit, step 201 to step 203 may be repeated again in the clock recovery circuit. In this way, it may be effectively ensured that the actual sampling rate of the ADC reaches the target sampling rate of the ADC.

In this embodiment, the phase detector generates the comparison sequence by using the known training sequence and the target sampling rate of the ADC, and calculates a correlation between the comparison sequence and the sampling sequences of the received signal, to determine a location of the training sequence in the sampling sequences, so that a deviation of the actual sampling rate of the ADC from the target sampling rate of the ADC is determined, and interference from a waveform impairment to the phase detection signal is reduced. In this way, it is effectively ensured that a correct phase detection signal is obtained.

The method for obtaining a phase detection signal in the embodiments of this application is described above, and the following describes a phase detector in the embodiments of this application.

Figure 4:
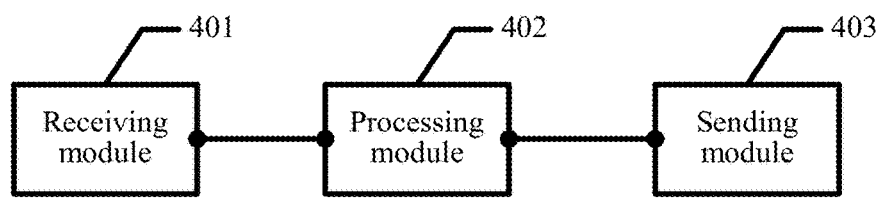
FIG. 4 is a schematic diagram of an embodiment of a phase detector according to an embodiment of this application.

Specifically, referring to FIG. 4, an embodiment of a phase detector according to an embodiment of this application includes: a receiving module 401 and a processing module 402.

The receiving module 401 is configured to receive sampling sequences sent by an analog to digital converter ADC. The sampling sequences are obtained by the ADC by sampling, based on an actual sampling rate, an electrical signal received by the ADC, and the electrical signal carries a pre-configured training sequence.

The processing module 402 is configured to: calculate a correlation between the sampling sequences and a comparison sequence, to determine a first location and a second location, where the first location and the second location are locations of a starting point of the training sequence in the sampling sequences, there is a difference of $M_1$ training sequence periods (where $M_1$ is a positive integer) between the first location and the second location in the sampling sequences, and the comparison sequence is generated by the phase detector based on the training sequence and a target sampling rate of the ADC; and obtain a phase detection signal based on a difference parameter of the first location and the second location.

With reference to the foregoing embodiment, the processor 402 is further configured to: calculate a correlation between the comparison sequence and the sampling sequence based on a first formula, to determine the first location of a starting point of the training sequence; and calculate a correlation between the comparison sequence and the sampling sequence based on a second formula, to determine the second location of a starting point of the training sequence.

With reference to the foregoing embodiment, the first formula is:

$$C_{n_0}[i] = \Sigma_{k_2=0}^{k_2=m-1} \Sigma_{k_1=0}^{k_1=N_p-1} r[n_0+k_2*N_p+k_1] P^* [\mod(k_1+i-1,N_p)+1];$$

the second formula is:

$$C_{n_1}[i] = \Sigma_{k_2=0}^{k_2=m-1} \Sigma_{k_1=0}^{k_1=N_p-1} r[n_1+k_2*N_p+k_1] P^* [\mod(k_1+i-1,N_p)+1];$$

the first location is:
a data sequence number corresponding to i in max($C_{n_0}[i]$, i=1, 2, . . . , $N_p$); and
the second location is:
a data sequence number corresponding to i in max($C_{n_1}[i]$, i=1, 2, . . . , $N_p$), where $r$ is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of $K_1 \, N_{p_s}$ is performed on $n_0$ (where $K_1$ is a positive integer), and m is a quantity of preselected comparison sequence periods.

With reference to the foregoing embodiment, the first formula is:

$$C_{n_0}[i] = \Sigma_{k_2=0}^{k_2=m-1} |\Sigma_{k_1=0}^{k_1=N_p-1} r[n_0+k_2*N_p+k_1] P^* [\mod(k_1+i-1,N_p)+1]|;$$

the second formula is:

$$C_{n_1}[i] = \Sigma_{k_2=0}^{k_2=m-1} |\Sigma_{k_1=0}^{k_1=N_p-1} r[n_1+k_2*N_p+k_1] P^* [\mod(k_1+i-1,N_p)+1]|;$$

the first location is:
a data sequence number corresponding to i in max($C_{n_0}[i]$, i=1, 2, . . . , $N_p$); and
the second location is:
a data sequence number corresponding to i in max($C_{n_1}[i]$, i=1, 2, . . . , $N_p$), where r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of $K_1 N_{p_s}$ is performed on $n_0$ (where $K_1$ is a positive integer), and m is a quantity of preselected comparison sequence periods.

With reference to the foregoing embodiment, the phase detector further includes a sending module 403, configured to send the phase detection signal to the ADC, so that the ADC adjusts the actual sampling rate based on the phase detection signal.

Optionally, the processing module 402 is specifically further configured to: compare the first location with the second location to obtain the difference parameter; and if the difference parameter indicates that the first location is greater than the second location, determine that the phase detection signal indicates that the actual sampling rate is less than the target sampling rate; if the difference parameter indicates that the first location is less than the second location, determine that the phase detection signal indicates that the actual sampling rate is greater than the target sampling rate; or if the difference parameter indicates that the first location is equal to the second location, determine that the phase detection signal indicates that the actual sampling rate is equal to the target sampling rate.

Further, the phase detector in FIG. 4 may further be configured to perform any step performed by the phase detector in FIG. 1 or FIG. 2, to implement any function that may be implemented by the phase detector in FIG. 1 or FIG. 2.

In this embodiment, the processing module 402 generates the comparison sequence generated by using the known training sequence, and calculates a correlation between the comparison sequence and the sampling sequences of the electrical signal, to determine a location of the training sequence in the sampling sequences, so that a deviation of the actual sampling rate of the ADC from the target sampling rate of the ADC is determined, and interference from a waveform impairment to the phase detection signal is reduced. In this way, it is effectively ensured that a correct phase detection signal is obtained.

Figure 5:
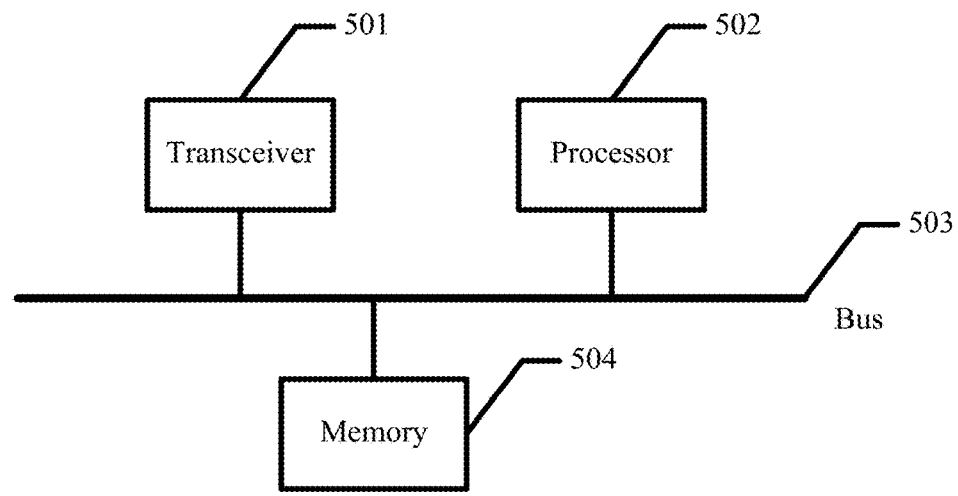
FIG. 5 is a schematic diagram of another embodiment of a phase detector according to an embodiment of this application.

Specifically, referring to FIG. 5, another embodiment of a phase detector according to an embodiment of this application includes a transceiver 501 and a processor 502. The transceiver 51 and the processor 502 are connected to each other by using a bus 503.

The bus 503 may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 5, but this does not mean that there is only one bus or only one type of bus.

The processor 502 may be a central processing unit (CPU), a network processor (NP), or a combination of the CPU and the NP.

The processor 502 may further include a hardware chip. The hardware chip may be an application-specific integrated circuit (ASIC), a programmable logic device (PLD), or a combination thereof. The PLD may be one or any combination of a complex programmable logical device (CPLD), a field programmable gate array (FPGA), and a generic array logic (GAL).

Referring to FIG. 5, the phase detector may further include a memory 504, and the memory 504 is configured to store the comparison sequence. The memory 504 may include a volatile memory, such as a random access memory (RAM); or the memory may also include a nonvolatile memory, for example, a flash memory, a hard disk drive (HDD), or a solid-state drive (SSD); or the memory 504 may include a combination of the foregoing memories.

Optionally, the memory 504 may be further configured to store a program instruction. The processor 502 invokes the program instruction stored in the memory 504, and may perform one or more steps or optional implementations in the embodiment shown in FIG. 2, to implement a function of a behavior of the phase detector in the foregoing method.

With reference to the foregoing embodiment, the processor 502 performs step 203 and step 204 in the foregoing embodiment.

The transceiver 501 receives sampling sequences sent by the ADC, and the transceiver 501 may further send a phase detection signal to the ADC.

In this embodiment, the processor 502 generates the comparison sequence by using the known training sequence, and calculates a correlation between the comparison sequence and the sampling sequences of the electrical signal, to determine a location of a training sequence in the sampling sequences, so that a deviation of an actual sampling rate of the ADC from a target sampling rate of the ADC is determined, and interference from a waveform impairment to the phase detection signal is reduced. In this way, it is effectively ensured that a correct phase detection signal is obtained.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for obtaining a phase detection signal in a clock recovery circuit, the method comprising:
 receiving, by a phase detector, sampling sequences sent by an analog to digital converter (ADC), wherein the sampling sequences are obtained by the ADC by sampling, based on an actual sampling rate, an electrical signal received by the ADC, and the electrical signal carries a pre-configured training sequence;
 calculating, by the phase detector, a correlation between the sampling sequences and a comparison sequence, to determine a first location and a second location, wherein the first location and the second location are locations of a starting point of the training sequence in the sampling sequences, there is a difference of M1 training sequence periods (wherein M1 is a positive integer) between the first location and the second location in the sampling sequences, and the comparison sequence is generated by the phase detector based on the training sequence and a target sampling rate of the ADC; and
 obtaining, by the phase detector, a phase detection signal based on a difference parameter of the first location and the second location.

2. The method according to claim 1, wherein calculating, by the phase detector, a correlation between the sampling sequences and a comparison sequence, to determine a first location and a second location comprises:
 calculating, by the phase detector, a correlation between the comparison sequence and the sampling sequence based on a first formula, to determine the first location of the starting point of the training sequence; and
 calculating, by the phase detector, a correlation between the comparison sequence and the sampling sequence based on a second formula, to determine the second location of the starting point of the training sequence.

3. The method according to claim 2, wherein:
the first formula is:

$$C_{n_0}[i] = \Sigma_{k_2=0}^{k_2=m-1} \Sigma_{k_1=0}^{k_1=N_p-1} r[n_0+k_2*N_p+k_1] P*[\mathrm{mod}(k_1+i-1, N_p)+1];$$

the second formula is:

$$C_{n_1}[i] = \Sigma_{k_2=0}^{k_2=m-1} \Sigma_{k_1=0}^{k_1=N_p-1} r[n_1+k_2*N_p+k_1] P*[\mathrm{mod}(k_1+i-1, N_p)+1];$$

the first location is:
a data sequence number corresponding to i in $\max(C_{n_0}[i]$, $i=1, 2, \ldots, N_p)$; and
the second location is:
a data sequence number corresponding to i in $\max(C_{n_1}[i]$, $i=1, 2, \ldots, N_p)$, where
r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of K1 $N_{p_s}$ is performed on $n_0$ (where K1 is a positive integer), and m is a quantity of preselected comparison sequence periods.

4. The method according to claim 2, wherein:
the first formula is:

$$C_{n_0}[i] = \Sigma_{k_2=0}^{k_2=m-1} \Sigma_{k_1=0}^{k_1=N_p-1} r[n_0+k_2*N_p+k_1] P*[\mathrm{mod}(k_1+i-1, N_p)+1];$$

the second formula is:

$$C_{n_1}[i] = \Sigma_{k_2=0}^{k_2=m-1} \Sigma_{k_1=0}^{k_1=N_p-1} r[n_1+k_2*N_p+k_1] P*[\mathrm{mod}(k_1+i-1, N_p)+1];$$

the first location is:
a data sequence number corresponding to i in $\max(C_{n_0}[i]$, $i=1, 2, \ldots, N_p)$; and
the second location is:
a data sequence number corresponding to i in $\max(C_{n_1}[i]$, $i=1, 2, \ldots, N_p)$, where
r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of K1 $N_{p_s}$ is performed on $n_0$ (where K1 is a positive integer), and m is a quantity of preselected comparison sequence periods.

5. The method according to claim 1, wherein after obtaining, by the phase detector, a phase detection signal based on a difference parameter of the first location and the second location, the method further comprises:
 sending, by the phase detector, the phase detection signal to the ADC to enable the ADC to adjust the actual sampling rate based on the phase detection signal.

6. The method according to claim 1, wherein obtaining, by the phase detector, a phase detection signal based on a difference parameter of the first location and the second location comprises:
 comparing, by the phase detector, the first location with the second location to obtain the difference parameter;
 when the difference parameter indicates that the first location is greater than the second location, determining, by the phase detector, that the phase detection signal indicates the actual sampling rate is less than the target sampling rate;
 when the difference parameter indicates that the first location is less than the second location, determining, by the phase detector, that the phase detection signal indicates the actual sampling rate is greater than the target sampling rate; and
 when the difference parameter indicates that the first location is equal to the second location, determining, by the phase detector, that the phase detection signal indicates the actual sampling rate is equal to the target sampling rate.

7. A phase detector, comprising:
a receiver, configured to receive sampling sequences sent by an analog to digital converter (ADC), wherein the sampling sequences are obtained by the ADC by sampling, based on an actual sampling rate, an electrical signal received by the ADC, and the electrical signal carries a pre-configured training sequence; and
a processor, configured to:
calculate a correlation between the sampling sequences and a comparison sequence, to determine a first location and a second location, wherein the first location and the second location are locations of a starting point of the training sequence in the sampling sequences, there is a difference of M1 training sequence periods (wherein M1 is a positive integer) between the first location and the second location in the sampling sequences, and the comparison sequence is generated by the phase detector based on the training sequence and a target sampling rate of the ADC, and
obtain a phase detection signal based on a difference parameter the first location and the second location.

8. The phase detector according to claim 7, wherein the processor is further configured to:
calculate a correlation between the comparison sequence and the sampling sequence based on a first formula, to determine the first location of the starting point of the training sequence; and
calculate a correlation between the comparison sequence and the sampling sequence based on a second formula, to determine the second location of the starting point of the training sequence.

9. The phase detector according to claim 8, wherein the first formula is:

$$C_{n_0}[i] = \Sigma_{k_2=0}^{k_2=m-1} \Sigma_{k_1=0}^{k_1=N_p-1} r[n_0+k_2*N_p+k_1] P^*[\mathrm{mod}(k_1+i-1,N_p)+1];$$

the second formula is:

$$C_{n_1}[i] = \Sigma_{k_2=0}^{k_2=m-1} \Sigma_{k_1=0}^{k_1=N_p-1} r[n_1+k_2*N_p+k_1] P^*[\mathrm{mod}(k_1+i-1,N_p)+1];$$

the first location is:
a data sequence number corresponding to i in $\max(C_{n_0}[i], i=1, 2, \ldots, N_p)$; and
the second location is:
a data sequence number corresponding to i in $\max(C_{n_1}[i], i=1, 2, \ldots, N_p)$, where
r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of K1 $N_p$ is performed on $n_0$ (where K1 is a positive integer), and m is a quantity of preselected comparison sequence periods.

10. The phase detector according to claim 8, wherein the first formula is:

$$C_{n_0}[i] = \Sigma_{k_2=0}^{k_2=m-1} |\Sigma_{k_1=0}^{k_1=N_p-1} r[n_0+k_2*N_p+k_1] P^*[\mathrm{mod}(k_1+i-1,N_p)+1]|;$$

the second formula is:

$$C_{n_1}[i] = \Sigma_{k_2=0}^{k_2=m-1} |\Sigma_{k_1=0}^{k_1=N_p-1} r[n_1+k_2*N_p+k_1] P^*[\mathrm{mod}(k_1+i-1,N_p)+1]|;$$

the first location is:
a data sequence number corresponding to i in $\max(C_{n_0}[i], i=1, 2, \ldots, N_p)$; and
the second location is:
a data sequence number corresponding to i in $\max(C_{n_1}[i], i=1, 2, \ldots, N_p)$, where
r is the sampling sequence, P is the comparison sequence, $n_0$ is the starting point of the sampling sequence, $N_p$ is a comparison sequence period, i is a data sequence number of the sampling sequence, $n_1$ is the starting point of the sampling sequence after a delay of K1 $N_p$ is performed on $n_0$ (where K1 is a positive integer), and m is a quantity of preselected comparison sequence periods.

11. The phase detector according to claim 7, wherein the phase detector further comprises:
a transmitter configured to send the phase detection signal to the ADC to enable the ADC to adjust the actual sampling rate based on the phase detection signal.

12. The phase detector according to claim 7, wherein the processor is further configured to:
compare the first location with the second location to obtain the difference parameter; and
when the difference parameter indicates that the first location is greater than the second location, determine that the phase detection signal indicates the actual sampling rate is less than the target sampling rate;
when the difference parameter indicates that the first location is less than the second location, determine that the phase detection signal indicates the actual sampling rate is greater than the target sampling rate; or
when the difference parameter indicates that the first location is equal to the second location, determine that the phase detection signal indicates the actual sampling rate is equal to the target sampling rate.

13. A phase detector, comprising:
a bus;
a transceiver coupled to the bus and configured to:
receiving sampling sequences sent by an analog to digital converter ADC, wherein the sampling sequences are obtained by the ADC by sampling, based on an actual sampling rate, an electrical signal received by the ADC, and the electrical signal carries a pre-configured training sequence; and
a processor coupled to the bus and configured to:
calculate a correlation between the sampling sequences and a comparison sequence, to determine a first location and a second location, wherein the first location and the second location are locations of a starting point of the training sequence in the sampling sequences, there is a difference of M1 training sequence periods (wherein M1 is a positive integer) between the first location and the second location in the sampling sequences, and the comparison sequence is generated by the phase detector based on the training sequence and a target sampling rate of the ADC, and
obtain a phase detection signal based on a difference parameter of the first location and the second location.

* * * * *